United States Patent
Huang et al.

(10) Patent No.: US 9,217,497 B2
(45) Date of Patent: Dec. 22, 2015

(54) PUSH CHAIN, LINEAR MOTION DRIVING DEVICE AND PATIENT TABLE

(75) Inventors: Jian Huang, Shanghai (CN); Jian Liu, Shanghai (CN); Yun Ping Wang, Shanghai (CN)

(73) Assignee: Siemens Aktiengesellschaft, München (DE)

( * ) Notice: Subject to any disclaimer, the term of this patent is extended or adjusted under 35 U.S.C. 154(b) by 213 days.

(21) Appl. No.: 13/572,002

(22) Filed: Aug. 10, 2012

(65) Prior Publication Data
US 2013/0205926 A1    Aug. 15, 2013

(30) Foreign Application Priority Data
Aug. 11, 2011 (CN) .................. 2011 2 0291050 U

(51) Int. Cl.
| F16H 7/06 | (2006.01) |
| F16G 13/20 | (2006.01) |
| B66F 3/06 | (2006.01) |
| F16H 19/06 | (2006.01) |

(52) U.S. Cl.
CPC .............. F16H 19/0636 (2013.01); B66F 3/06 (2013.01); F16G 13/20 (2013.01); F16H 7/06 (2013.01); *Y10T 74/18096* (2015.01)

(58) Field of Classification Search
CPC ..... F16H 19/06; F16H 19/0636; F16H 55/30; F16H 7/06; F16H 9/16; F16H 9/24; F16H 7/08; F16H 7/18; F16G 13/20; B66F 3/06; B65H 5/02; B65H 5/026
USPC ............. 74/89.2, 89.21, 89.22; 474/140, 139, 474/160; 59/78, 84, 85, 78.1; 254/311, 358
See application file for complete search history.

(56) References Cited

U.S. PATENT DOCUMENTS

| 2,048,131 | A | * | 7/1936 | Madsen ........................... 49/325 |
| 3,289,811 | A | * | 12/1966 | Kelley ........................ 414/791.3 |
| 4,227,421 | A | * | 10/1980 | Weishew ........................... 74/27 |

(Continued)

FOREIGN PATENT DOCUMENTS

| AT | 325512 T | 6/2006 |
| CN | 201150539 Y | 11/2008 |

(Continued)

OTHER PUBLICATIONS

German Office Action dated Dec. 23, 2014 for corresponding DE 10 2012 214 270.3, with English Translation.

*Primary Examiner* — William C Joyce
*Assistant Examiner* — Jude Agendia
(74) *Attorney, Agent, or Firm* — Lempia Summerfield Katz LLC

(57) ABSTRACT

A push-chain includes a plurality of push-chain links, each push-chain link of the plurality of push-chain links including two strip-shaped mounting pieces disposed opposite one another and one connecting piece that connects at most half of an end face of the two mounting pieces at one side. Each of the two mounting pieces is provided with two mounting holes in the length direction. A distance between the two mounting holes is equal to half the length of the mounting piece. The mounting holes on the two mounting pieces are arranged opposite one another, and two corners on another side of each of the two mounting pieces are rounded corners allowing the push-chain to bend. Two adjacent push-chain links of the plurality of push-chain links are hinge-connected in a horizontally staggered arrangement by way of a chain pivot and the mounting holes.

18 Claims, 3 Drawing Sheets

(56) References Cited

U.S. PATENT DOCUMENTS

| | | | |
|---|---|---|---|
| 4,272,952 A * | 6/1981 | Graham | 59/84 |
| 4,297,840 A * | 11/1981 | Gurney et al. | 59/85 |
| 4,625,507 A * | 12/1986 | Moritz et al. | 59/78.1 |
| 4,672,805 A * | 6/1987 | Moritz | 59/78.1 |
| 6,065,278 A * | 5/2000 | Weber et al. | 59/78.1 |
| 6,315,688 B1 * | 11/2001 | McLaughlin et al. | 474/82 |
| 7,017,328 B2 * | 3/2006 | Komiya et al. | 59/78.1 |
| 7,056,246 B2 * | 6/2006 | Foster et al. | 474/140 |
| 7,167,739 B2 * | 1/2007 | Van De Rijdt et al. | 600/415 |
| 7,591,128 B2 * | 9/2009 | Komiya | 59/78.1 |
| 7,669,401 B2 * | 3/2010 | Schneider | 59/35.1 |
| 8,695,320 B2 * | 4/2014 | Scolari et al. | 59/78 |
| 2003/0177752 A1 * | 9/2003 | Nakagawa et al. | 59/5 |
| 2004/0185978 A1 * | 9/2004 | Prince | 474/206 |
| 2008/0202868 A1 * | 8/2008 | Heitmeyer | 188/33 |
| 2008/0271429 A1 * | 11/2008 | Komiya | 59/78.1 |
| 2009/0008615 A1 * | 1/2009 | Young et al. | 254/133 R |
| 2010/0320061 A1 * | 12/2010 | Saunders et al. | 198/626.1 |

FOREIGN PATENT DOCUMENTS

| | | |
|---|---|---|
| CN | 201308591 Y | 9/2009 |
| CN | 201308591 Y * | 9/2009 |
| DE | 650777 A | 10/1937 |
| DE | 1890452 U | 4/1964 |
| DE | 20102310 U1 | 4/2001 |
| DE | 10137939 A1 | 3/2003 |
| WO | WO2004006597 A1 | 1/2004 |

* cited by examiner

PUSH CHAIN, LINEAR MOTION DRIVING DEVICE AND PATIENT TABLE

This application claims the benefit of CN 201120291050.1, filed on Aug. 11, 2011.

TECHNICAL FIELD

The present embodiments relate to the field of driving technology.

BACKGROUND

Linear motion driving devices may be used in many mechanical structures, and the sprocket/push-chain driving device is one of these. Sprocket/push-chain driving devices may include a push-chain, a sprocket and a guiding component. One end of the push-chain has a connecting part, and another end of the push-chain passes around the sprocket and is placed freely. When the sprocket rotates, the sprocket drives the push-chain to move. The guiding component is in contact with the push-chain and is used to guide the push-chain to move in a set linear direction. The sprocket/push-chain driving devices may also include a push-chain box for accommodating the sprocket and the freely placed end of the push-chain.

Existing push-chains may be assembled from a relatively large number of chain sections of different shapes and have disadvantages such as, for example, a relatively high cost and complicated assembly.

The Chinese patent application with application no. 20082013537.4 discloses a vertical motion driving device of the sprocket/push-chain type for a patient table. As FIG. 1 shows, this vertical motion driving device includes a push-chain 1, a sprocket 2, guiding components 3 and a push-chain box 4. The section of the push-chain 1 that is arranged in the vertical direction is used to support a bed board of the patient table. The sprocket 2 and the push-chain 1 are meshed with one another. The sprocket 2 is capable of driving the push-chain 1 to move when the sprocket 2 rotates, such that the push-chain 1 drives the bed board in up/down vertical motion under the action of the guiding components.

Chinese patent application no. 20082000631.4 discloses a horizontal motion driving device of the sprocket/push-chain type for a patient table. This device similarly includes a sprocket, a push-chain, guiding components, and a push-chain box. One end of the push-chain has a connecting part for connecting to the bed board of the patient table, while the other end passes around the sprocket and is placed freely. When the sprocket rotates, the sprocket drives the push-chain in reciprocal horizontal motion, thereby making the push-chain drive the bed board in reciprocal horizontal motion under the action of the guiding components.

SUMMARY AND DESCRIPTION

The present embodiments may obviate one or more of the drawbacks or limitations in the related art. For example, a push-chain that reduces cost and increases the effective travel of the push-chain is provided.

One embodiment of the push-chain includes a plurality of push-chain links. Each push-chain link of the plurality of push-chain links includes two strip-shaped mounting pieces disposed opposite one another and one connecting piece that connects at most half of an end face of the two mounting pieces at one side. Each of the two mounting pieces is provided with two mounting holes in the longitudinal direction. A distance between the two mounting holes is equal to half the length of the mounting piece. The mounting holes on the two mounting pieces are arranged opposite one another, and two corners on another side of each of the two mounting pieces are rounded corners allowing the push-chain to bend. Two adjacent push-chain links of the plurality of push-chain links are hinge-connected in a horizontally staggered arrangement by way of a chain pivot and the mounting holes.

In one embodiment, the connection between the connecting piece and the mounting piece forms a filleted corner.

Alternatively, the connection between the connecting piece and the mounting piece forms a right angle.

In one embodiment, a bearing is also installed on the chain pivot.

In another embodiment, the width of a middle portion of the connecting piece is less than or equal to half the length of the mounting piece. The width of both end portions of the connecting piece is slightly narrower than the width of the middle portion in accordance with a set range.

One embodiment of a linear motion driving device includes a sprocket, a guiding component, and a push-chain in any one of the above-described forms of implementation. One end of the push-chain has a connecting part, and another end of the push-chain passes around the sprocket and is placed freely. When the sprocket rotates, the sprocket drives the push-chain to move. The guiding component is in contact with the push-chain and is used to guide the push-chain to move in a set linear direction.

In one embodiment, the linear motion driving device further includes a push-chain box for accommodating the sprocket and the push-chain.

In one embodiment, a long U-shaped guiding structure is provided inside the push-chain box. The long U-shaped allows the push-chain to extend along the long U-shaped guiding structure after passing around the sprocket so as to bend around at another end of the push-chain box, forming two parallel layers.

In one embodiment, the device further includes a driver for driving the sprocket to rotate in forward and reverse directions.

One embodiment of a patient table includes a linear motion driving device in any of the above-described forms of implementation. A bed board of the patient table is connected to the push-chain connecting part in the linear motion driving device.

Since, in the present embodiments, a whole push-chain may be assembled from push-chain links of the same shape and full assembly of a single section of chain requires only two of the same push-chain links and one chain pivot (e.g., three functional components in total), the number of types of components used by the whole chain is greatly reduced compared to the prior art. The universal nature of the components results in a large reduction in the cost of the chain. The space of one section of chain is provided for the turning radius of the chain, which is a reduction of a third compared to the prior art. The space of the push-chain box is correspondingly reduced, and the effective travel of the push-chain is correspondingly increased.

DETAILED DESCRIPTION OF THE DRAWINGS

Figure 1:
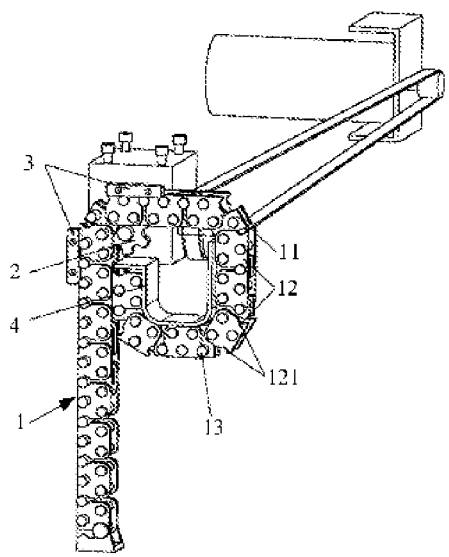
FIG. 1 is a structural schematic diagram of a vertical motion driving device of the sprocket/push-chain type in the prior art.
Figure 2A:
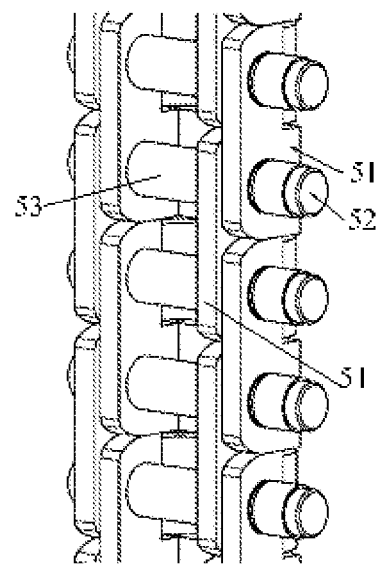
FIGS. 2a to 2d are structural schematic diagrams of embodiments of a push-chain in the embodiments of the present invention.
Figure 2B:
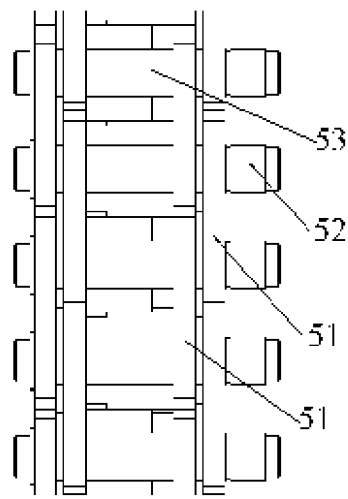
Figure 2C:
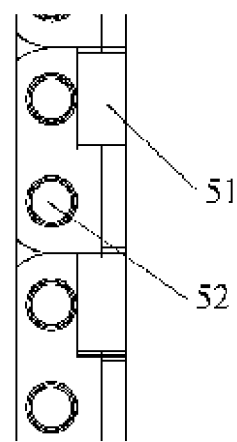
Figure 2D:
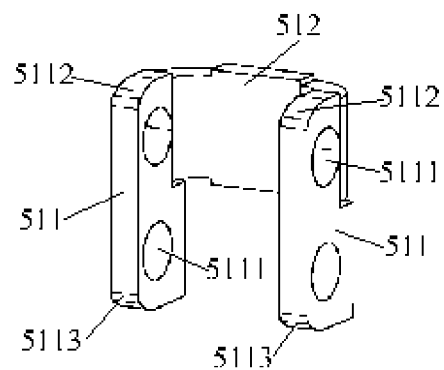

FIGS. 2a to 2d are structural schematic diagrams of embodiments of a push-chain. FIG. 2a is a three-dimensional drawing of the push-chain, FIG. 2b and FIG. 2c are a two-dimensional main view and a two-dimensional right view of the push-chain, respectively, and FIG. 2d is a structural schematic diagram of one push-chain link of the push-chain. As FIGS. 2a to 2d show, one embodiment of a push-chain 5 includes a plurality of push-chain links 51. Each push-chain link of the plurality of push-chain links 51 includes two strip-shaped mounting pieces 511 (e.g., mounting pieces) disposed opposite one another and a connecting piece 512 (e.g., one connecting piece) that connects, at most, half of an end face of the two mounting pieces 511 at one side. Each of the two mounting pieces 511 is provided with two mounting holes 5111 in the length direction. A distance between the two mounting holes 5111 is equal to half the length of the mounting piece 511. For example, a mounting hole 5111 may be provided both at one quarter and at three quarters of the length of the mounting piece 511. The mounting holes 5111 on the two mounting pieces 511 are arranged opposite one another, and two corners 5112 and 5113 on the other side of each of the two mounting pieces 511 are rounded corners allowing the push-chain to bend. Two adjacent push-chain links of the plurality of push-chain links 51 are hinge-connected in a horizontally staggered arrangement by way of a chain pivot 52 and the mounting holes 5111.

In one embodiment, in order to reduce noise, a bearing 53 (e.g., a needle roller bearing) may also be installed on the chain pivot 52.

In one embodiment, each push-chain link of the plurality of push-chain links 51 may be formed as a single unit. For example, the single unit may be formed by machining a steel plate, by casting, or by another method. In another embodiment, each push-chain link of the plurality of push-chain links 51 may be formed by connecting independent elements together. For example, the mounting pieces 511 and the connecting piece 512 may be connected by such methods as, for example, welding or riveting to form the push-chain link 51.

The connection between the mounting pieces 511 and the connecting pieces 512 may form a filleted corner or a right angle. In one embodiment, in order to facilitate mounting and prevent interference from arising between one push-chain link of the plurality of push-chain links 51 and another push-chain link of the plurality of push-chain links 51, the connecting piece 512 may have a structure that is slightly wider in the middle and slightly narrower at the two ends. In other words, the width of a middle portion of the connecting piece 512 is less than or equal to half the length of the mounting piece 511, while the width of two end portions of the connecting piece 512 is slightly narrower than the width of the middle portion in accordance with a set range.

A single section of chain may be fully assembled from just two identical push-chain links and one chain pivot. In order to achieve a low noise level, a bearing is also installed on the chain pivot. The positions of two push-chain links are in a horizontally staggered arrangement and are separated in the vertical direction by a distance of one chain pivot section. Such an assembly allows each section of chain to be connected to the next. The number of types of components used by the whole chain is greatly reduced compared to the prior art, while the universal nature of the components results in a large reduction in the cost of the chain. The space of just one section of chain is used for the turning radius of the chain, so that the space used by the push-chain in terms of push-chain box space is smaller.

Figure 3:
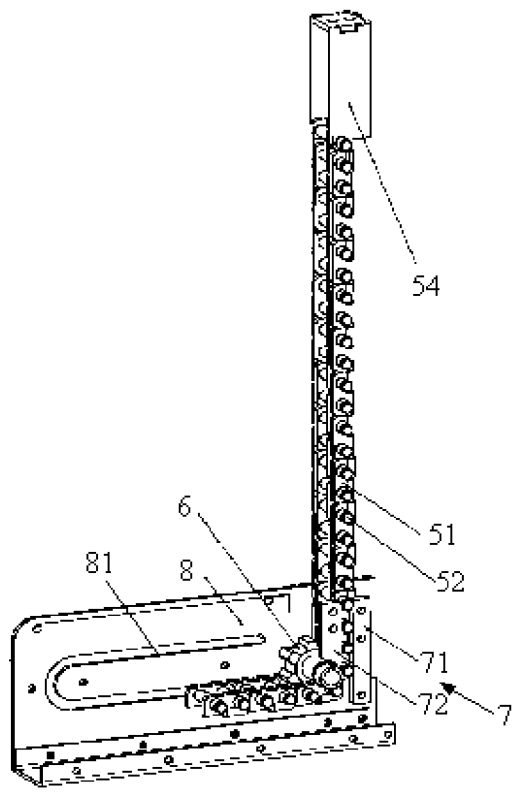
FIG. 3 is a structural schematic diagram of one embodiment of a linear motion driving device.

FIG. 3 is a structural schematic diagram of one embodiment of a linear motion driving device. As FIG. 3 shows, the linear motion driving device includes a sprocket 6, a guiding component 7, a push-chain box 8, and one embodiment of a push-chain 5 (e.g., in any one of the forms of implementation described above).

One end of the push-chain 5 has a connecting part 54. Another end of the push-chain passes around the sprocket 6 and is placed freely. When the sprocket 6 rotates, the sprocket 6 drives the push-chain 5 to move. The guiding component 7 is in contact with the push-chain 5 and is used to guide the push-chain 5 to move in a set linear direction. FIG. 3 takes the vertical direction as an example for description but in actual applications, the linear direction may also be the horizontal direction.

The push-chain box 8 is used to accommodate the sprocket 6 and the push-chain 5. In this embodiment, a long U-shaped guiding structure is provided inside the push-chain box 8. This allows the push-chain 5 to extend along the long U-shaped guiding structure after passing around the sprocket 6 so as to bend around at another end of the push-chain box 8, forming two parallel layers. The push-chain box 8 may be omitted in some actual applications.

In FIG. 3, the guiding component 7 includes a first guide rail piece 71 and a second guide rail piece 72 located on the two sides of the push-chain 5 and for guiding the push-chain 5 to move in a vertical direction.

In this embodiment, the sprocket 6 drives the push-chain 5 in linear motion in the exit direction of the first guide rail piece 71 and second guide rail piece 72, and the chain pivots 52 of the push-chain 5 are able to maintain linear motion in the same direction continuously under the guiding action of the first guide rail piece 71 and the second guide rail piece 72. As shown in the embodiment of FIG. 2c, the assembly structure of the push-chain 5 provides that the bending of the push-chain 5 may only occur in one direction, while vertically adjacent push-chain links of the plurality of push-chain links 51 may have two different contact faces on the left and the right therebetween. This may allow the stress on the push-chain 5 in a direction of motion to be distributed equally between the left and right contact faces. This way of bearing stress may achieve an anti-bending function in a similar way to a frame, such that in the direction of motion, a single section of chain may not develop a tendency to bend. As long as the connecting part 54 at the end of the chain stays in the same direction as that of the guide rail pieces 71 and 72, the push-chain 5 will not bend during movement and long-travel linear motion may be achieved. As long as the space of the push-chain box 8 is not limited, the maximum movement length of the push-chain 5 may not be limited.

The linear motion driving device in this embodiment may also include a driver (not shown in the figures) for driving the sprocket 6 to rotate in forward and reverse directions and thereby drive the push-chain 5 to move. The driver may be implemented using a variety of devices such as, for example, an electric motor.

The motor may be directly connected to the sprocket 6 or may be connected via a transmission mechanism (not shown in the figures). The transmission mechanism is connected to the motor and to the sprocket 6. The transmission mechanism may include a gearbox that is connected to the sprocket 6 and to the motor either directly or via a rubber belt. When the rubber belt is used to connect the motor to the gearbox, one end of the rubber belt is looped around a belt wheel of the motor, while another end of the rubber belt is looped around a belt wheel of the gearbox.

In one embodiment, a medical apparatus includes a linear motion driving device in any of the above-described forms of implementation. The linear motion may be vertical motion or horizontal motion. A bed board of a patient table may be connected to the push-chain connecting part in the linear motion driving device.

In one embodiment where there is a gearbox, a speed reduction gearbox may be used as the gearbox. The speed reduction gearbox may drive the sprocket to rotate with a lower speed, thereby providing that the speed of lifting and lowering of the patient table is not too fast. The patient table may thus be easily controlled to move to a precise position.

The embodiments described above are not intended to limit the invention. Any amendments, equivalent substitutions or improvements made without departing from the spirit and principles of the present invention should be included within the scope of protection thereof.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A push-chain comprising:
   a plurality of push-chain links, each push-chain link of the plurality of push-chain links comprising two strip-shaped mounting pieces disposed opposite one another and one connecting piece that connects at most half of an end face of each mounting piece of the two strip-shaped mounting pieces at one end of a first side, the connection providing a planar surface comprising an external surface of the connecting piece and exposed end faces of the mounting pieces not connected to the connecting piece,
   wherein each mounting piece of the two strip-shaped mounting pieces comprises two mounting holes in a length direction, a distance between the two mounting holes being equal to half a length of the mounting piece,
   wherein a corner on the first side of each mounting piece of the two strip-shaped mounting pieces at an opposite end of the connecting piece is a right angle corner,
   wherein the mounting holes on the two strip-shaped mounting pieces are arranged opposite one another, and two corners on a second side, opposite the first side, of each mounting piece of the two strip-shaped mounting pieces are rounded corners allowing the push-chain to bend, and
   wherein two adjacent push-chain links of the plurality of push-chain links are hinge-connected in a horizontally staggered arrangement by way of a chain pivot and the mounting holes, wherein only one strip-shaped mounting piece of a push-chain link of the plurality of push-chain links is positioned between two strip-mounting pieces of an adjacent push-chain link of the plurality of push-chain links.

2. The push-chain as claimed in claim 1, wherein a connection between the one connecting piece and a mounting piece of the two strip-shaped mounting pieces forms a filleted corner.

3. The push-chain as claimed in claim 1, wherein a connection between the one connecting piece and a mounting piece of the two strip-shaped mounting pieces forms a right angle.

4. The push-chain as claimed in claim 1, further comprising a bearing installed on the chain pivot.

5. The push-chain as claimed in claim 1, wherein a width of a middle portion of the one connecting piece is less than or equal to half the length of the mounting piece of the two strip-shaped mounting pieces, and
   wherein a width of both end portions of the one connecting piece is narrower than the width of the middle portion in accordance with a set range.

6. The push-chain as claimed in claim 2, wherein a connection between the one connecting piece and a mounting piece of the two strip-shaped mounting pieces forms a right angle.

7. The push-chain as claimed in claim 2, further comprising a bearing installed on the chain pivot.

8. The push-chain as claimed in claim 3, further comprising a bearing installed on the chain pivot.

9. The push-chain as claimed in claim 2, wherein a width of a middle portion of the one connecting piece is less than or equal to half the length of the mounting piece of the two strip-shaped mounting pieces, and
   wherein a width of both end portions of the one connecting piece is narrower than the width of the middle portion in accordance with a set range.

10. The push-chain as claimed in claim 3, wherein a width of a middle portion of the one connecting piece is less than or equal to half the length of the mounting piece of the two strip-shaped mounting pieces, and
    wherein a width of both end portions of the one connecting piece is narrower than the width of the middle portion in accordance with a set range.

11. The push-chain as claimed in claim 4, wherein a width of a middle portion of the one connecting piece is less than or equal to half the length of the mounting piece of the two strip-shaped mounting pieces, and
    wherein a width of both end portions of the one connecting piece is narrower than the width of the middle portion in accordance with a set range.

12. A linear motion driving device comprising:
    a sprocket;
    a guiding component; and
    a push-chain comprising:
       a plurality of push-chain links, each push-chain link of the plurality of push-chain links comprising two strip-shaped mounting pieces disposed opposite one another and one connecting piece that connects at most half of an end face of the two strip-shaped mounting pieces at one end of a first side, the connection providing a planar surface comprising an external surface of the connecting piece and exposed end faces of the mounting pieces not connected to the connecting piece,
       wherein each mounting piece of the two strip-shaped mounting pieces comprises two mounting holes in a length direction, a distance between the two mounting holes being equal to half a length of the mounting piece,
       wherein a corner on the first side of each mounting piece of the two strip-shaped mounting pieces at an opposite end of the connecting piece is a right angle corner,
       wherein the mounting holes on the two strip-shaped mounting pieces are arranged opposite one another, and two corners on a second side, opposite the first side, of each mounting piece of the two strip-shaped mounting pieces are rounded corners allowing the push-chain to bend, wherein two adjacent push-chain links of the plurality of push-chain links are hinge-connected in a horizontally staggered arrangement by way of a chain pivot and the mounting holes, and wherein only one strip-shaped mounting piece of a push-chain link of the plurality of push-chain links is positioned between two strip-mounting pieces of an adjacent push-chain link of the plurality of push-chain links, wherein one end of the push-chain has a connecting part, and another end of the push-chain passes around the sprocket and is placed freely, wherein when the sprocket rotates, the sprocket is operable to drive the push-chain to move, and wherein the guiding component is in contact with the push-chain and is operable to guide the push-chain to move in a set linear direction.

13. The linear motion driving device as claimed in claim 12, further comprising a push-chain box for accommodating the sprocket and the push-chain.

14. The linear motion driving device as claimed in claim 13, further comprising a U-shaped guiding structure, the U-shaped guiding structure being disposed inside the push-chain box.

15. The linear motion driving device as claimed in claim 12, further comprising a driver operable to drive the sprocket to rotate in forward and reverse directions.

16. The linear motion driving device as claimed in claim 13, further comprising a driver operable to drive the sprocket to rotate in forward and reverse directions.

17. The linear motion driving device as claimed in claim 14, further comprising a driver operable to drive the sprocket to rotate in forward and reverse directions.

18. A patient table comprising:
a bed board; and
a linear motion driving device comprising:
  a sprocket;
  a guiding component; and
  a push-chain comprising:
    a plurality of push-chain links, each push-chain link of the plurality of push-chain links comprising two strip-shaped mounting pieces disposed opposite one another and one connecting piece that connects at most half of an end face of the two strip-shaped mounting pieces at one end of a first side, the connection providing a planar surface comprising an external surface of the connecting piece and exposed end faces of the mounting pieces not connected to the connecting piece, wherein each mounting piece of the two strip-shaped mounting pieces comprises two mounting holes in a length direction, a distance between the two mounting holes being equal to half a length of the mounting piece, wherein a corner on the first side of each mounting piece of the two strip-shaped mounting pieces at an opposite end of the connecting piece is a right angle corner, wherein the mounting holes on the two strip-shaped mounting pieces are arranged opposite one another, and two corners on a second side, opposite the first side, of each mounting piece of the two strip-shaped mounting pieces are rounded corners allowing the push-chain to bend, wherein two adjacent push-chain links of the plurality of push-chain links are hinge-connected in a horizontally staggered arrangement by way of a chain pivot and the mounting holes, and wherein only one strip-shaped mounting piece of a push-chain link of the plurality of push-chain links is positioned between two strip-mounting pieces of an adjacent push-chain link of the plurality of push-chain links, wherein one end of the push-chain has a connecting part, and another end of the push-chain passes around the sprocket and is placed freely, wherein when the sprocket rotates, the sprocket is operable to drive the push-chain to move, wherein the guiding component is in contact with the push-chain and is operable to guide the push-chain to move in a set linear direction, and wherein the bed board is connected to the push-chain connecting.

* * * * *